United States Patent [19]
Quakenbrush

[11] 3,829,912
[45] Aug. 20, 1974

[54] RETRACTABLE BED ASSEMBLIES
[75] Inventor: Howard M. Quakenbrush, Monona Village, Wis.
[73] Assignee: Flexsteel Industries, Inc., Dubuque, Iowa
[22] Filed: Sept. 1, 1971
[21] Appl. No.: 176,985

[52] U.S. Cl. .................................... 5/10 B, 5/118
[51] Int. Cl. .......................................... A47c 17/14
[58] Field of Search ................. 5/10, 118, 115, 116; 108/149

[56] References Cited
UNITED STATES PATENTS

| | | | |
|---|---|---|---|
| 67,494 | 8/1867 | Burnett | 5/10 |
| 931,962 | 8/1909 | Rountree | 5/10 |
| 1,068,974 | 7/1913 | Brown | 5/10 |
| 1,087,490 | 2/1914 | Henery | 5/10 |
| 1,819,516 | 8/1931 | Kelly | 108/149 |
| 3,623,168 | 11/1971 | Rouch | 5/10 |

*Primary Examiner*—Casmir A. Nunberg
*Attorney, Agent, or Firm*—Alberts, Brezina & Lund

[57] ABSTRACT

A retractable bed assembly adapted to be mounted to a support structure such as the wall of a recreational vehicle, to move between a storage position adjacent the ceiling and a use position spaced vertically from the ceiling. The assembly includes a bed platform pivotally connected to the support structure by means of a first and second pair of linkages pivotally connected to the ends of the bed platform to enable it to be raised and lowered from the ceiling in a pivotal manner, while maintaining the bed platform in a position substantially parallel to the ceiling. A spring biases the bed platform into its storage position, and a latch secures the bed platform in its use position.

5 Claims, 10 Drawing Figures

INVENTOR
HOWARD M. QUAKENBUSH

BY
Alberts, Brezina + Lund
ATTORNEYS

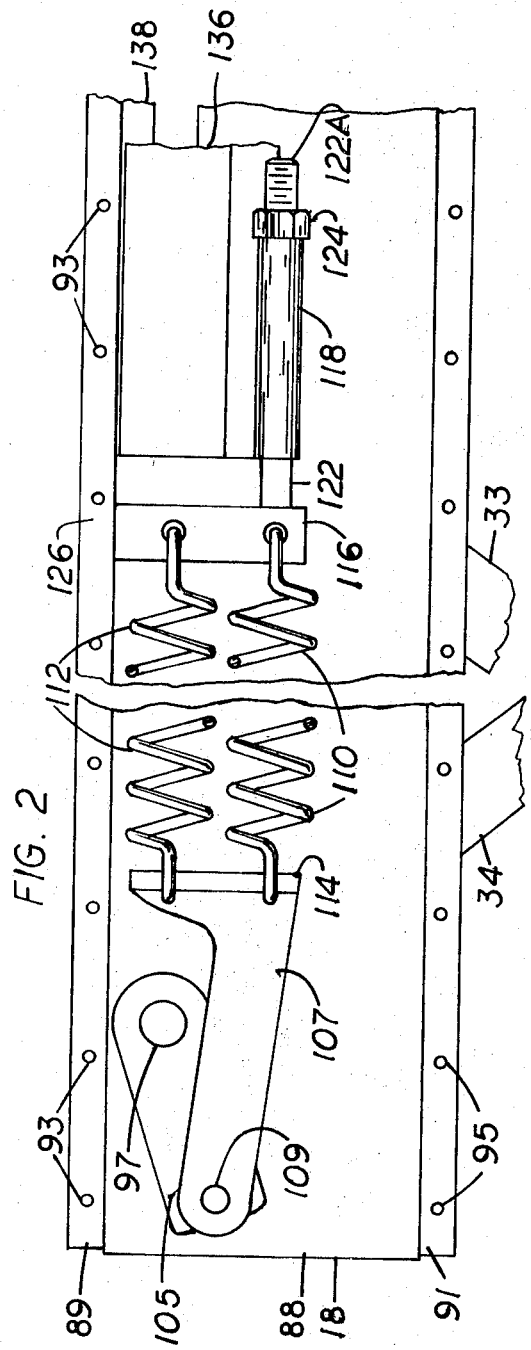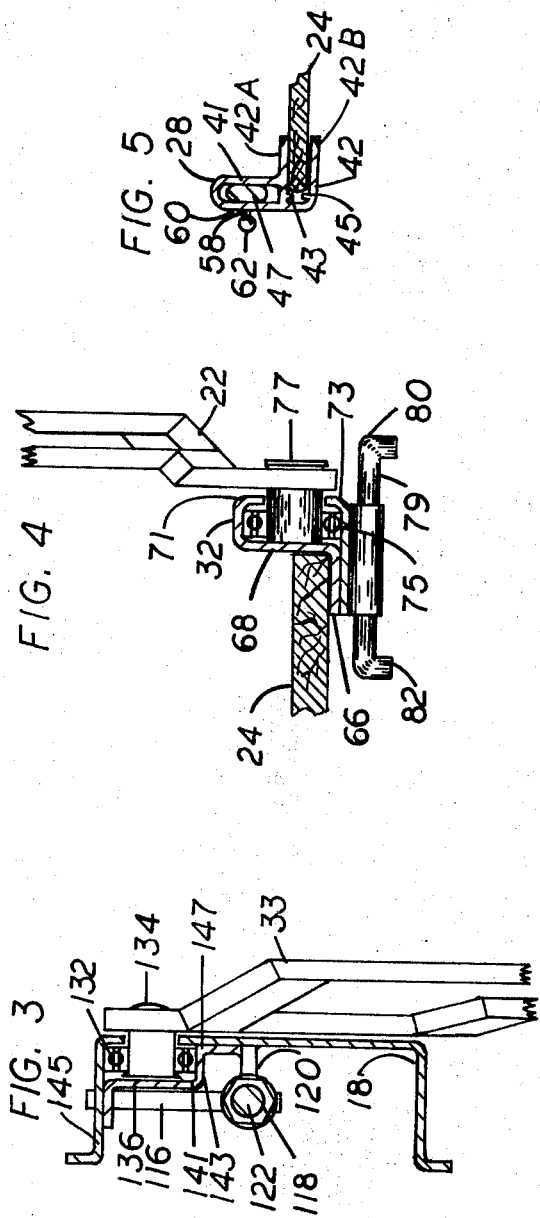

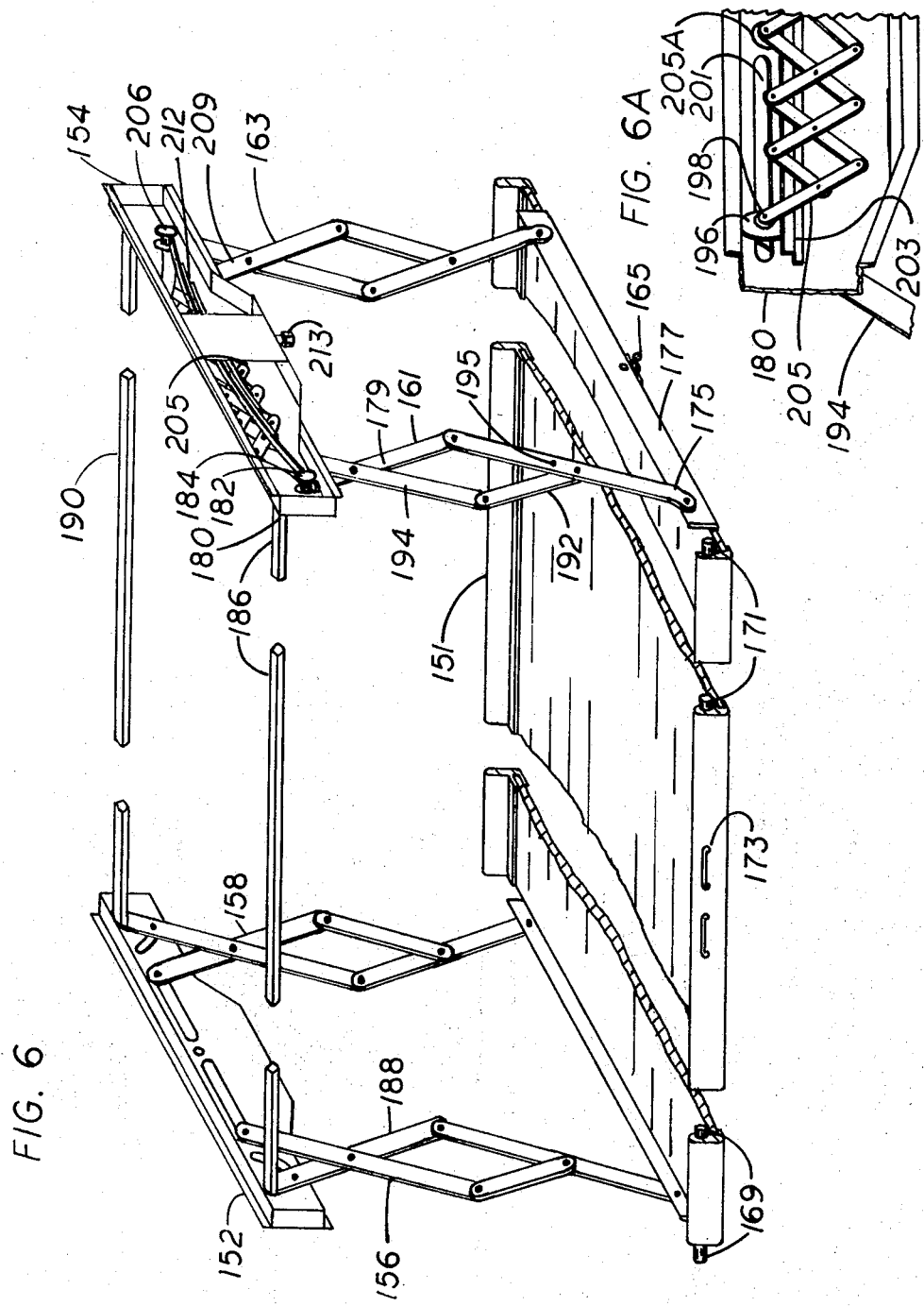

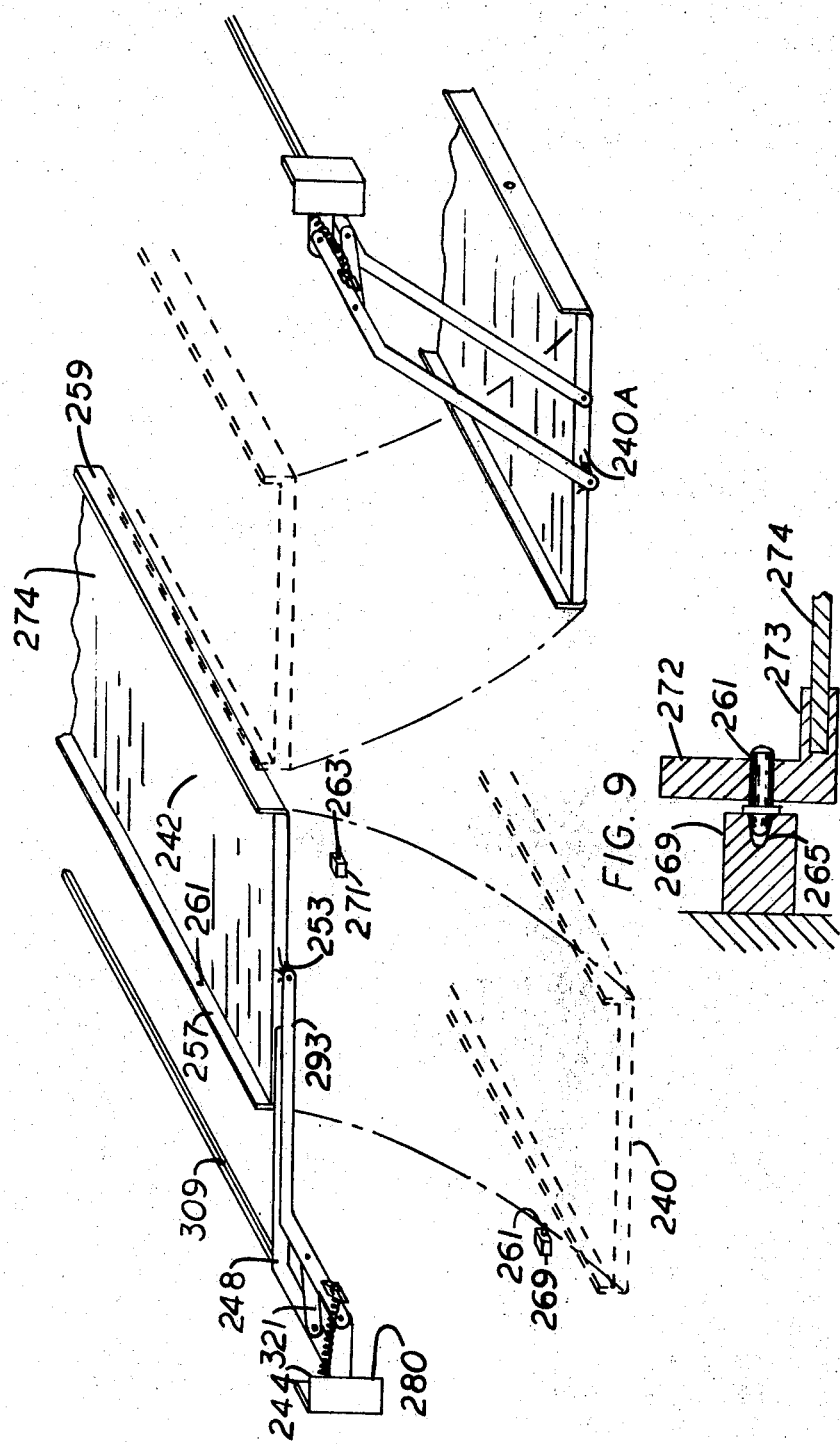

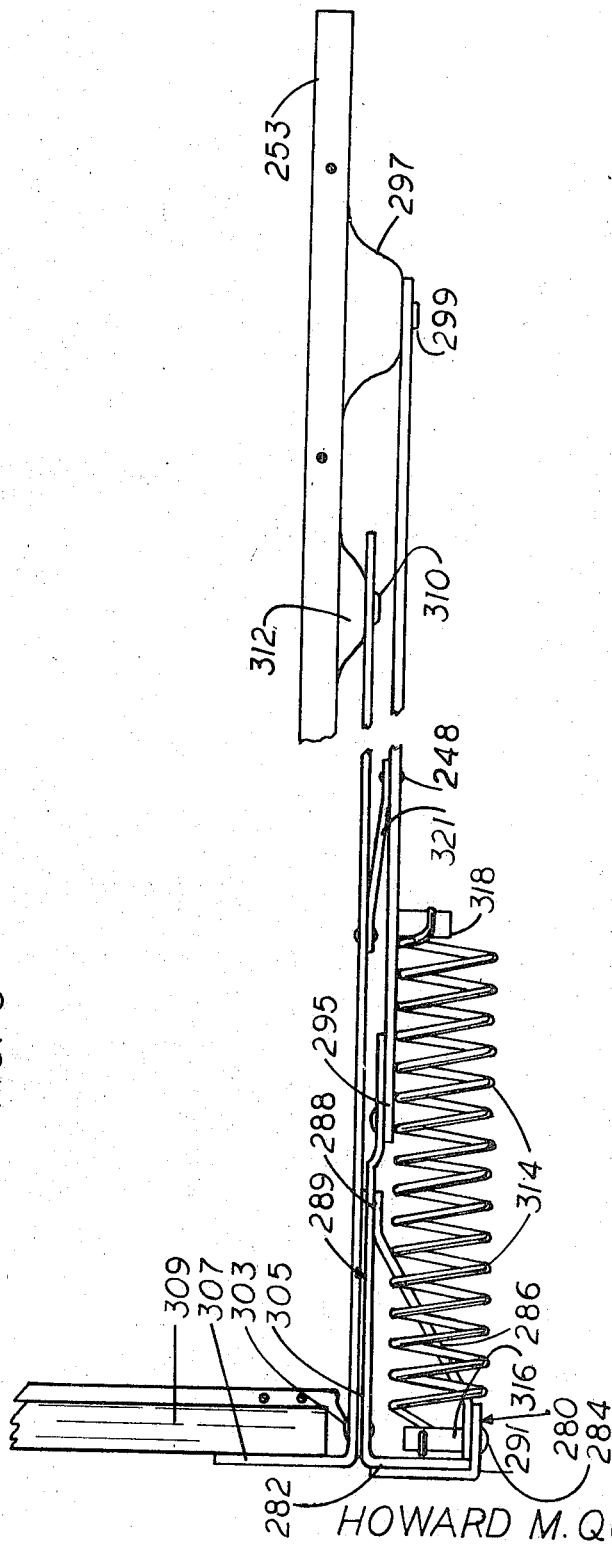

3,829,912

RETRACTABLE BED ASSEMBLIES

This invention relates to a retractable bed assembly and more particularly to a retractable bed assembly adapted for use in a recreational vehicle or other environments where it is desirable to conserve space.

Many different types and kinds of retractable bed assemblies have been provided for use in recreational vehicles, such as campers, or other vehicles, such as trains, whereby the bed or bunk may be stored in a position adjacent the ceiling or roof and a use position spaced intermediate the floor and the ceiling. However, the bed assemblies have not been entirely satisfactory for some applications, in that they have been complex mechanically and thus expensive and not readily installable. Moreover, the prior art bed assemblies have not been readily movable between the storage and use positions, and many of them have not maintained the bed platform in a substantially horizontal position during the movement of the bed platform between the two positions. In this regard, it is highly desirable to have a retractable bed assembly which is readily movable between the storage and use positions in such a manner that the bed platform is maintained in a generally horizontal position so that the bedding remains in place.

Accordingly, the principal object of the present invention is to provide a new and improved retractable bed assembly.

Another object of the present invention is to provide a new and improved retractable bed assembly, which is readily movable between storage and use positions, while maintaining the bed portion in a generally horizontal orientation.

Very briefly, the above and further objects are realized in accordance with the present invention by providing a retractable bed assembly including a bed platform which is pivotally connected to a support structure by means of pairs of linkages pivotally connected to the opposite ends of the bed platform, a spring for biasing the bed platform into a position adjacent the ceiling for storage purposes, and a latch for securing the bed platform in its use position.

This invention contemplates other objects, advantages and features which will become more fully apparent from the following detailed description taken in connection with the accompanying drawings which illustrate preferred embodiments and in which:

FIG. 2 is an enlarged, fragmentary view partially in cross section of one of the mounting brackets of the bed assembly of FIG. 1;

FIG. 3 is a cross-sectional view of the bracket of FIG. 2 taken substantially along the line III—III thereof;

FIG. 4 is an enlarged, fragmentary view of the bed assembly of FIG. 1, taken substantially along the line IV—IV thereof;

FIG. 5 is an enlarged, fragmentary cross-sectional view of the bed assembly of FIG. 1 taken substantially along the line V—V thereof;

FIG. 6 is a fragmentary isometric view of another retractable bed assembly which is constructed in accordance with the present invention;

FIG. 6A is a view on an enlarged scale of a portion of a lazy tong mechanism of the assembly of FIG. 6;

FIG. 7 is an isometric view of yet another retractable bed assembly which is constructed in accordance with the present invention;

FIG. 8 is an enlarged plan view of an end portion of the bed assembly of FIG. 7 in its storage position; and FIG. 9 is an enlarged cross-sectional view of a latching device for the bed assembly of FIG. 7.

Figure 1:
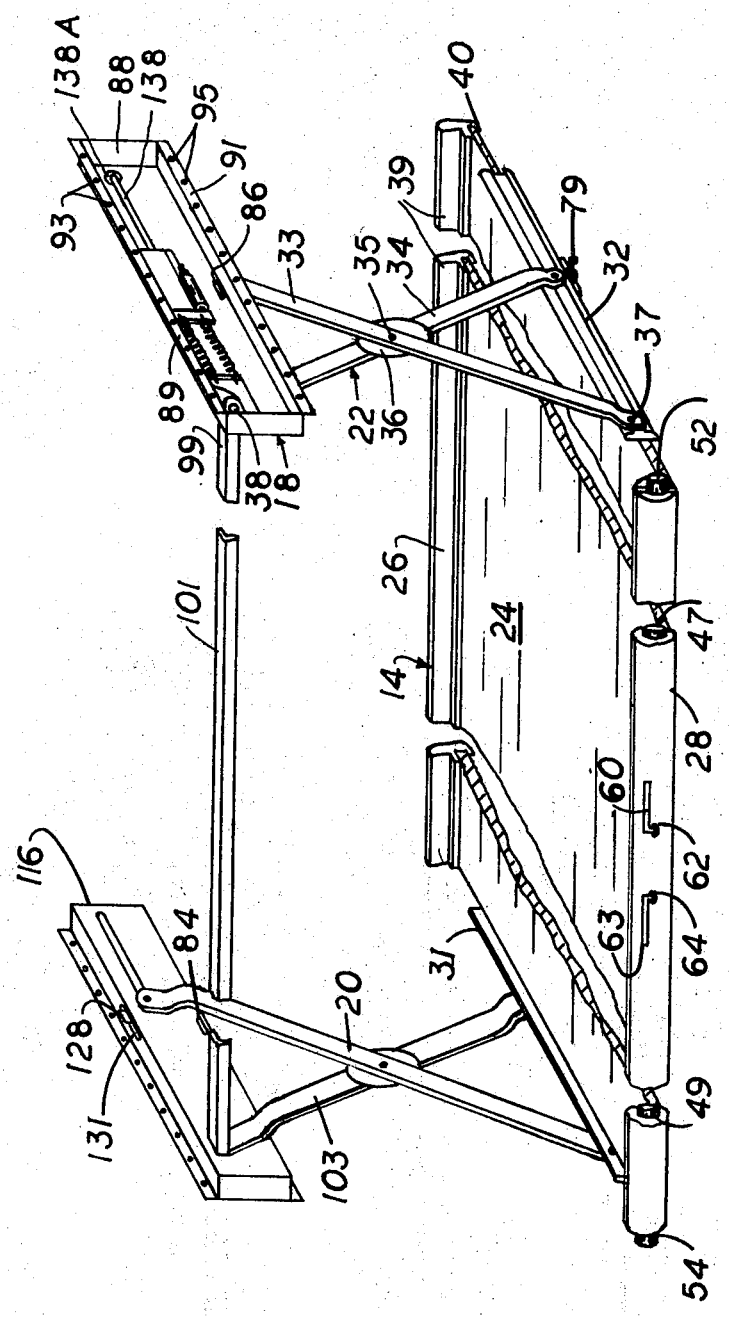
FIG. 1 is a fragmentary isometric view of a retractable bed assembly constructed in accordance with the principles of the present invention.

Referring now to the drawings, and more particularly to FIGS. 1 to 5 thereof, there is shown a retractable bed assembly 10, which is constructed in accordance with the present invention and which is mounted between a pair of oppositely-disposed parallel vertical walls, such as the wall 12. The assembly 10 generally comprises a rectangular bed platform 14, and a pair of mounting brackets 16 and 18 which are mounted on the oppositely-disposed walls in alignment with one another near the ceiling or roof and which have a pair of retractable linkages 20 and 22 connecting the opposite ends of the platform 14 and the respective brackets 16 and 18. In operation, the platform 14 may be moved between its use position as illustrated in FIG. 1 and a storage position adjacent the ceiling between the mounting brackets 16 and 18.

Considering now the retractable bed assembly 10 in greater detail, the platform 14 is adapted to support a mattress (not shown) and other bedding, and comprises a generally rectangular sheet or slab 24, which may be composed of any suitable material, such as plywood, a pair of side mounting rails 26 and 28 extending the entire length of the opposite side edges of the sheet 24, and a pair of end mounting rails 31 and 32 supporting the marginal end edge portions of the sheet 24 and connected to the respective mounting brackets 16 and 18 by means of the linkages 20 and 22. The linkages 20 and 22 are similar to one another, and thus only the linkage 22 will now be described in greater detail. The linkage 22 generally comprises a pair of links 33 and 34, which are pivotally connected at their mid-points at 35 with a swivel disc 36 therebetween. The lower end of the link 33 is pivotally connected at 37 to the end rail 32 near one end thereof, and the lower end of the link 34 is rollably entrained within the rail 32 to move toward and away from the pivot point 37 as hereinafter described in greater detail. The upper end of the link 34 is pivotally connected to the bracket 18 at 38, and the upper end of the link 33 is rollably entrained within the bracket 16 as hereinafter described in greater detail, to move toward and away from the pivot point 38 when the platform 14 is lowered and raised, respectively.

As shown in FIG. 1, the rail 26 is generally L-shaped and has an upstanding leg portion 39 and an inwardly-extending horizontal leg portion 40 which is channel-shaped to receive snugly the side edge of the sheet 24 by means of a friction fit. The other side rail 28 is similar to the rail 26 and is generally L-shaped in cross section having an upstanding leg portion 41 and an inwardly-extending horizontal leg portion 42 which is channel-shaped to receive the marginal edge portion of the sheet 24 by means of a friction fit. The leg portion 42 has an upper flange 42A and a lower flange 42B for receiving the edge portion of the sheet 24 therebetween, and a pair of oppositely-disposed internal ridges or abutments 43 and 45 extend from the respective flanges 42A and 41B against which is positioned the side edge of the sheet 24. The upstanding leg portion 41 is generally U-shaped in cross section and is integrally connected to the horizontal leg portion 42 with a pair of locking bars 47 and 49 slidably mounted therewithin, whereby the locking bars 47 and 49 may be slid longitudinally within the leg portion 41 away from one another until the opposite end portions 52 and 54 enter a pair of sockets, such as the socket 56, in the opposite walls, to secure the platform 14 in its use position as shown in FIG. 1 and to stabilize the platform and prevent shifting movement laterally while it is in use. It is noted that the weight of the platform is sufficient to keep it in its downward position, spring means hereinafter described being for the purpose of assisting upward movement and not for the purpose of automatically moving the bed means upwardly upon release of the locking means.

It should be understood that instead of providing a socket in the wall, any suitable opening in the wall may be provided and disposed at the desired distance from the ceiling for retaining and stabilizing the platform 14 in its use position. A rod or pin 58 rigidly connected at its inner end to the bar 47 extends through a slot 60, and is fixed at its outer end to a knob 62 to enable the locking bar 47 to be grasped by the hand of the user and moved into and out of the locking position. Similarly, a rod (not shown) extends through a slot 63 and is fixed at its inner end to the bar 49 and at its outer end to a knob 64. Each one of the slots, such as the slot 60, has an U-shaped portion at each end thereof, whereby the rod 58 may be positioned in its outer end portion to lock the bar 47 in place, or in its inner end portion to maintain the bar 47 in its released position when the platform 14 is disposed in its storage position.

Considering now the end rails 31 and 32, the rails 31 and 32 are similar to one another, and, as best seen in FIG. 4, the rail 32 is generally L-shaped in cross section. The rail 32 includes a horizontal inwardly-extending flange portion 66, upon which rests the platform 24, and an upstanding channel-shaped leg portion 68, which has a pair of inwardly-turned flange portions 71 and 73 to retain a ball-bearing roller 75 within the channel-shaped leg portion 68 to rollably entrain the lower end of the link 34 within the rail 32. In this regard, the roller 75 is rotatably fixed to the lower end of the link 34 by means of a stud 77.

In order to lock the platform 14 in its storage position, slidably attached to the undersides at the midpoints of the end rails 31 and 32 are a pair of locking pins or rods, such as the pin 79 having downturned end portions 80 and 82, the pins being adapted to extend through a pair of slots 84 and 86 in the respective brackets 16 and 18 when the platform 14 is in its storage position. In operation, after the platform 14 is pushed upwardly until the pins are opposite the slots, the pins are first rotated until the downturned portions extend horizontally, and the pins are then slid outwardly into the horizontally-extending slots. Thereafter, the pins are rotated through 90°. The procedure is reversed to unlock the platform.

Considering now the mounting brackets 16 and 18, the brackets are similar to one another, and thus only the bracket 18 will be discussed in some detail. The bracket 18 includes an elongated rectangular housing 88 having upper and lower flanges 89 and 91, which have a series of holes such as the holes 93 and 95 for receiving mounting screws or other mounting means for fastening the housing 88 to the support structure. Pivotally mounted on the inside of the housing 88 at the pivot point 38 is the upper end portion of the link 34, which has a bent portion 99 fastened to one end of a torque bar 101, which in turn has its opposite end secured in like manner to a link 103 of the linkage 20. As a result, when the links 34 and 103 move pivotally about their pivot points, the links move in unison as a result of the torque bar 101 to insure that the platform 14 does not cock from end to end during movement of the platform 14 between its use and storage positions. Thus, the platform 14 is maintained substantially parallel to the ceiling during raising or lowering of the platform. Rigidly connected to the pivot pin 38 on the inside of the housing 88 is a link 105, which has its opposite end pivotally connected to a link 107 at a pivot point 109. At the opposite end of the link 107 a pair of springs 110 and 112 are stretched between a flange 114 and an indicator bar 116 to bias the platform 14 into its retracted position and thus to assist the movement of the platform 14 upwardly into its storage position. A sleeve 118 is mounted on the inside of the housing 88 by means of a bar 120 (FIG. 3) which is secured in place by any suitable technique such as welding, and in turn supports and surrounds a rod 122, which has one of its ends secured to the indicator bar 116 to support it in position. A lock nut 124 is threaded onto a threaded end portion 122A of the rod 122 to fix the position of the rod 122 and thus the bar 116 relative to the sleeve 118 so that the tension on the springs 110 and 112 may be adjusted. In this regard, the upper end of the indicator bar 116 extends through a slot 126 in the upper wall of the housing 88 to provide an indication of the position of the bar 116 and thus the tension on the springs 110 and 112. In like manner, an indicator bar 128 for the mounting assembly 16 extends through a slot 131 to indicate the spring tension for the assembly 16. However, it should be understood at this point that the assembly 16 need not be similar to the assembly 18 insofar as the linkage 20 need not be spring biased, since springs 110 and 112 of the bracket 18 may be sufficient to act via the torque bar 101 to return the platform 14 to its retracted position.

A ball bearing roller 132 is rotatably connected at 134 to the upper end of the link 33 and is entrained on a track 136 mounted on the inside of the housing 88 and extending adjacent a slot 138 through which extends the pivot pin 134. As shown in FIG. 3, the track 136 is generally L-shaped and has an upstanding portion 141 and a lower roller supporting portion 143. A horizontal flange portion 145 extends from the horizontal leg 141 and is secured to the housing 88 by any suitable technique such as welding, and a vertical flange portion 147 depends from the horizontal leg portion 143 and is similarly secured to the housing 88. An enlarged generally circular portion 138A (FIG. 1) of the slot 138 at the end thereof permits access of the roller 132 to the track 136 with the axle 134 extending through the slot 138.

Referring now to FIG. 6 of the drawings, there is shown a retractable bed assembly 150, which is also constructed in accordance with the principles of the present invention. The assembly 150 generally comprises a platform 151 for supporting a mattress (not shown) in the same manner as the platform 14 of FIG. 1, and a pair of mounting brackets 152 and 154 which are adapted to be fastened to a pair of vertical spaced-apart support structures, such as a pair of opposite walls (not shown), and which have a pair of retractable lazy-tong linkages 156 and 158 for supporting one end of the platform 151 from the bracket 152, and a pair of lazy-tong linkages connecting the other end of the platform 151 to the mounting bracket 154. In its use position as shown in FIG. 6, the platform 151 is spaced vertically from the ceiling or roof, and in its storage position the platform 151 is disposed in a position between the brackets 152 and 154 adjacent the ceiling. In the storage position, a pair of locking pins or rods, such as the rod 165, are slidably mounted below the platform 151 at the ends thereof to extend into and engage a pair of slots 166 and 167 in the mounting brackets 152 and 154 in the same manner as the locking pin 79 and the slot 86 of FIG. 1. In order to retain the platform 151 in its use position, a pair of locking bars 169 and 171 are slidably mounted within a side rail 173 of the platform 151 in the same manner and for the same purpose as the locking bars 147 and 149 of FIG. 2.

Considering now the linkages and mounting brackets in greater detail, the mounting brackets 152 and 154 are similar to one another, and thus only the mounting bracket 154 will be described in some detail. The linkages 161 and 163 connecting the bracket 154 and the platform 151 are also similar to one another and cooperate to enable the platform 151 to be raised and lowered from its storage position between the mounting brackets 152 and 154. Since the linkages are similar to one another, only the linkage 161 will be described in detail. The lazy-tong linkage 161 has a link 175 which is pivotally connected at its lower end to an end rail 177 of the platform 151 and at its upper end to a link 179, which in turn is pivotally connected at its upper end to the outside of the face of a rectangular boxlike housing 180 of the bracket 154. A roller 182 is disposed on a pin or stud extending from the back side of the link 179 through an arcuate guide slot 184 in the face of the housing 180. A torque bar 186 connects the upper horizontally-extending distal end portion of the link 179 and a corresponding link 188 of the linkage 156 in the same manner and for the same purpose as the torque bar 101 of FIG. 1. Similarly, a torque bar 190 connects the linkages 163 and 158. A short link 192 is pivotally connected at its lower end to the link 175 intermediate the ends thereof, and the upper end of the link 175 is pivotally connected to a link 194. An abutment or stop member 195 extending from the front side of the adjacent link 175 limits the downward travel of the platform 151. The upper end of the link 194 has a roller 196 rotatably mounted thereon at the inside of the bracket housing 180 by means of an axle 198, which extends through an elongated guide slot 201 in the face of the housing 180, whereby the roller 196 is adapted to roll along a track 203 mounted on the inside of the bracket housing 180. At a point intermediate their ends the links 194 and 179 are pivotally connected together at a pivot point below the housing 180 when the linkage 161 is in the position as illustrated in FIG. 6.

In order to maintain the platform 151 substantially parallel to the ceiling during movement between the storage and use positions, a lazy-tong mechanism 205 is connected between the roller 195 of the link 194 and a corresponding roller 207 supported by the track 203 and connected to a corresponding link 209 of the linkage 163. A portion of the lazy-tong mechanism is shown in FIG. 6A. A mid-section joint of the lazy-tong mechanism is attached to the housing by means of a rivet 205A. As the rollers 196 and 207 roll toward and away from one another along the track 203, the lazy-tong mechanism 205 governs the action to cause the rollers to move in unison at the same speed and to cause both linkages to move upwardly and downwardly in unison. For the purpose of assisting the movement of the platform 151 toward its storage position between the brackets 152 and 154, a leaf spring 212 is mounted within the housing 180 and has its ends bearing against the undersides of the roller 182 and a corresponding roller 216 for the linkage 163 to bias the rollers 182 and 216 upwardly. A screw 213 has an upper end engaging the spring 212 and is adjustable to adjust the force exerted by the spring 212.

Referring now to FIGS. 7, 8 and 9 of the drawings, there is shown another retractable bed assembly 240, which is also constructed in accordance with the principles of the present invention. The assembly 240 is a cantilevered assembly which is mounted on a single wall, and includes a bed platform 242 which may be moved between a position adjacent the ceiling or roof and a use position spaced from the ceiling while maintaining the platform substantially parallel to the ceiling. As shown in FIG. 7, a second retractable bed assembly 240A is mounted on an opposite wall to illustrate the manner in which a pair of similar bed assemblies may be used where space is limited, such as in a recreational vehicle. In this regard, it should be noted that the bed platforms of the bed assemblies 240 and 240A, when in their storage positions, are closely spaced near the ceiling or roof. In use, the bed platforms of the bed assemblies 240 and 240A may be swung downwardly to their use position adjacent the side walls to provide a pair of bunk beds or the like.

Considering now the retractable bed assembly 240 in greater detail, the bed assembly 240 is similar to the assembly 240A, and thus only the assembly 240 will be described in greater detail. The assembly 240 generally comprises the bed platform 242 which is adapted to support a mattress (not shown) and is in turn supported from the wall by means of a pair of end brackets 244 and 246, which have a pair of pivotal linkages 248 and 251 connecting the brackets 244 and 246 and a pair of respective end rails 253 and 255 of the platform 242.

The platform 242 includes a pair of side rails 257 and 259, and the side rail 257 adjacent the wall carries a pair of respective pins 261 and 263 which have conical portions engageable in holes 265 and 267 in blocks 269 and 271, secured to a wall, to retain the platform 242 in its use position. As seen in FIG. 9, the side rail 257 is generally L-shaped and has a vertical leg 272 and a horizontal channel-shaped leg 273, which receives the marginal end edge portion of a slab or sheet 274, which is preferably composed of plywood.

Considering now the mounting brackets and linkages in greater detail, since the pairs of brackets and linkages are similar to one another, only the bracket 244 and the linkage 248 will be described. The mounting bracket 244 includes an L-shaped bracket 280 having a wall engaging leg portion 282 adapted to be fastened to the wall, and an outer leg portion 284, which is connected to a strut 286, which in turn is connected to a leg 288 of an L-shaped bracket 289. A leg 291 of the bracket 289 overlies and is secured to the leg 282 of the bracket 280. One end of a downwardly bent outer arm 293 of the linkage 248 is pivotally connected to the leg 288 at 295, its other end being pivotally connected to a large boss 297 extending from the side rail 253 and 299. One end of a downwardly bent inner arm 301 of the linkage 248 is pivotally connected at 303 to the leg 288 to the rear of the pivot point 295, a washer 305 being disposed therebetween. The leg portion 307 of the arm 301 is bent at right angles thereto and thus is parallel to the wall, the leg portion 307 being fastened to a torque bar 309 which has its other end fastened to a corresponding link of the linkage 251 to insure that the platform 242 does not cock end to end during movement thereof between its use and storage positions, whereby the platform 242 is maintained substantially parallel to the ceiling. The opposite end of the arm 301 is pivotally connected at 310 to a smaller boss 312 extending from the side rail 253. A bias spring 314 is stretched between a pin 316 extending from the leg 284 and a pin 318 extending from the arm 293 to bias the platform 242 into its retracted or storage position, and to maintain the platform in its storage position, so that the spring 314 assists the movement of the platform into its storage position and maintains it in that position. A short link 321 is pivotally connected at one of its ends to the arm 293 and at its other end to the arm 301 to insure that the arms 293 and 301 move in unison.

While the present invention has been described in connection with the particular embodiments thereof, it will be understood that those skilled in the art may make many changes and modifications without departing from the invention. Accordingly, it is intended by the appended claims to cover all such changes and modifications as fall within the true spirit and scope of this invention.

I claim as my invention:

1. A retractable bed assembly adapted to be movably mounted to a support structure to move between a storage position adjacent a ceiling and a use position spaced downwardly from the ceiling comprising: bed means adapted to be moved relative to the support structure between the storage position adjacent the ceiling and the downward use position in substantially parallel relationship relative to the ceiling; a first set of linkages connecting one end of said bed means to the support structure; a second set of linkages connecting the other end of said bed means to the support structure, said first and second sets of linkages being arranged to maintain said bed means parallel to the ceiling during movement between the storage and use positions; and spring means for resiliently urging said bed means toward its storage position, said first and second sets of linkages each comprising first and second links pivotally connected together intermediate their ends, further including a pair of mounting brackets adapted to be mounted to a pair of spaced-apart vertical supports of the support structure, said bed means being generally rectangular and including a pair of end rails extending along end edges thereof, said first and second links being pivotally connected between said end rails and said mounting brackets, at least one torque bar interconnecting said first links, each one of said first links being pivotally connected at one of its ends to one of said end rails and being rollably connected at its other end to one of said mounting brackets, each one of said second links being pivotally connected to the last-mentioned mounting bracket, the other end of said second link being rollably connected to the last-mentioned end rail.

2. A retractable bed assembly according to claim 1, wherein said spring means is stretched between said second link and its mounting bracket, further including means for adjusting the tension on said spring means, and means for latching said bed means in its storage position.

3. In a retractable bed assembly as defined in claim 1, each one of said second links being pivotally connected to the associated one of said mounting brackets in alignment with the pivotal connection between said first link and its end rail.

4. In a retractable bed assembly as defined in claim 1, said end rails being positionable in proximity to vertical walls during movement of said bed means between said storage and use positions, and stabilizing means carried by said bed means and arranged for locking engagement with at least one of the vertical walls to stabilize said bed means in said use position thereof.

5. A retractable bed assembly adapted to be movably mounted to a support structure to move between a storage position adjacent a ceiling and a use position spaced downwardly from the ceiling comprising: bed means adapted to be moved relative to the support structure between the storage position adjacent the ceiling and the downward use position in substantially parallel relationship relative to the ceiling; a first set of linkages connecting one end of said bed means to the support structure; a second set of linkages connecting the other end of said bed means to the support structure, said first and second sets of linkages being arranged to maintain said bed means parallel to the ceiling during movement between the storage and use positions; and spring means for resiliently urging said bed means toward its storage position, said bed means being generally rectangular and including a side rail extending along one side edge thereof, said rail having an upstanding hollow open-ended leg portion, said latching means including at least one stabilizing bar being slidably mounted within said hollow leg portion and its end portion being adapted to cooperate with socket means on the support structure to latch said bed means in its use position.

* * * * *